United States Patent [19]

Shinoda et al.

[11] Patent Number: 4,533,531
[45] Date of Patent: Aug. 6, 1985

[54] EXHAUST FUME DESULFURIZATION PROCESS

[75] Inventors: Naoharu Shinoda; Atsushi Tatani; Naohiko Ukawa; Susumu Okino, all of Hiroshima, Japan

[73] Assignee: Mitsubishi Jokogyo Kabushiki Kaisha, Tokyo, Japan

[21] Appl. No.: 606,137

[22] Filed: May 2, 1984

[51] Int. Cl.³ .............................................. B01D 53/34
[52] U.S. Cl. .................................... 423/242; 423/244; 423/555
[58] Field of Search ........... 423/242 R, 242 A, 244 R, 423/244 A, 555

[56] References Cited

U.S. PATENT DOCUMENTS

| 3,904,742 | 9/1975 | Akimoto | 423/242 |
| 3,920,794 | 11/1975 | La Mantia et al. | 423/242 |
| 4,420,465 | 12/1983 | Shinoda et al. | 423/242 |

Primary Examiner—Earl C. Thomas
Attorney, Agent, or Firm—Birch, Stewart, Kolasch & Birch

[57] ABSTRACT

An exhaust fume desulfurization process is disclosed which comprises the steps of contacting an off-gas containing $SO_2$ with a slurry containing calcium and manganese compounds, introducing a gas containing oxygen into the slurry, detecting the amount of the absorption of oxygen by the slurry, and regulating the amount of manganese present in the slurry based upon the amount of oxygen absorbed by the slurry. The desulfurization rate is correspondingly adjusted and the desulfurized gas product is recovered.

12 Claims, 4 Drawing Figures

EXHAUST FUME DESULFURIZATION PROCESS

This invention relates to an exhaust fume desulfurization method, and more particularly to the improvements in the exhaust fume desulfurization method according to a so-called wet lime/gypsum process in which $SO_2$ in a combustion off-gas is removed by using calcium compounds such as lime stone, slaked lime, dolomite, etc., as an absorbent material.

In the absorbing step in a wet lime/gypsum process exhaust fume desulfurizing apparatus, an off-gas containing $SO_2$ is contacted with a slurry containing calcium compounds with a small solubility such as $Ca(OH)_2$, $CaCO_3$, $CaSO_3 \cdot \frac{1}{2}H_2O$, $CaSO_4 \cdot 2H_2O$, etc., so that $SO_2$ in the off-gas is absorbed into the slurry. The $SO_2$ absorption reaction can be generically expressed by the following reaction formulae:

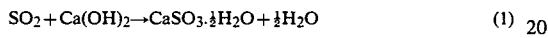

$$SO_2 + Ca(OH)_2 \rightarrow CaSO_3 \cdot \tfrac{1}{2}H_2O + \tfrac{1}{2}H_2O \quad (1)$$

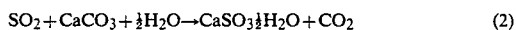

$$SO_2 + CaCO_3 + \tfrac{1}{2}H_2O \rightarrow CaSO_3 \cdot \tfrac{1}{2}H_2O + CO_2 \quad (2)$$

An oxidation reaction of the following formula is also induced by oxygen in the off-gas:

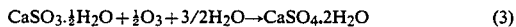

$$CaSO_3 \cdot \tfrac{1}{2}H_2O + \tfrac{1}{2}O_2 + 3/2 H_2O \rightarrow CaSO_4 \cdot 2H_2O \quad (3)$$

The generic reaction formulae, as shown above, are simple, but the actual reaction mechanism is not so simple; various types of dissolved ions such as $Ca^{2+}$, $Mg^{2+}$, $SO_4^{2-}$, $Na^+$, $SO_3^{2-}$, $HSO_3^-$, $CO_3^{2-}$, $HCO_3^-$, $H_2SO_3$, $H_2CO_3$, $Cl^-$, $F^-$, $Al^{3+}$, $Mn^{2+}$, $S_2O_6^{2-}$, $H^+$ and $OH^-$ participate in a very complicated way, and the chemical factors that influence the desulfurizing performance in the absorption step are diversified. Such complexity is evident from the fact that even today many different analytical studies are being made on such diversified chemical factors and various desulfurization techniques have been proposed or are under study. In addition to the complexity of the $SO_2$ absorption reaction in the gas-liquid-solid three-phase system, the influence of a variety of minor components on the desulfurizing performance is also an important matter of consideration, but many are left unknown concerning such matter. Among the minor components, those which are relatively well known beside $SO_2$, especially in combustion off-gas are NOx, ammonia compounds, halogen compounds and particulates. $Ca(OH)_2$ and $CaCO_3$ used as an $SO_2$ absorbent are prepared from naturally occurring limestone or dolomite, so that they contain impurities such as aluminum compounds, silicon compounds, iron compounds and manganese compounds. It goes without saying that make-up water which is essential in the wet (liquid) process also contains impurities.

In the course of the studies and investigations on the influence of these components on the desulfurization performance, the present inventors found that the manganese compounds give a specific influence to the desulfurization performance and reached the present invention.

Thus, the present invention provides a method for desulfurizing an off-gas containing $SO_2$ by contacting said off-gas with a slurry containing calcium compounds, wherein a part of said slurry is introduced into an aeration tank while a gas containing oxygen is blown into said aeration tank provided with a means for detecting the oxygen pickup by the slurry in said tank, and according to the detection of said oxygen pickup, a manganese compound is supplied into the slurry to be contacted with said off-gas to thereby control the desulfurization rate.

These and other objects, features and advantages of this invention will become more apparent from a consideration of the following detailed description of the invention when taken in conjunction with the accompanying drawings.

Figure 1:
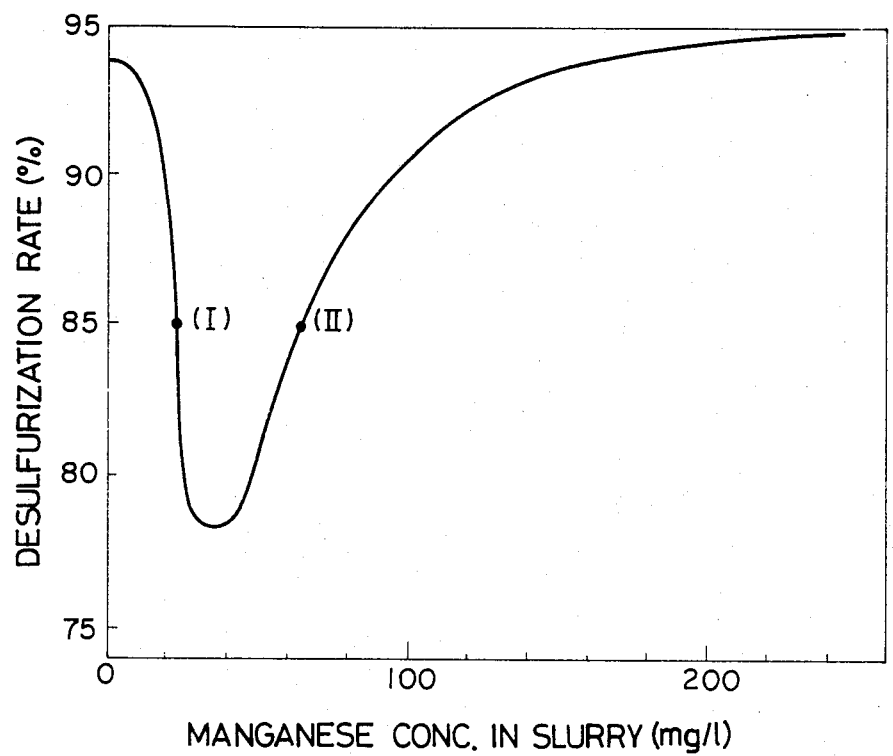
FIG. 1 is a diagram showing the specific relation between manganese content in the slurry and desulfurization rate, on which the proposal of this invention is based.

FIG. 1 is a diagram depicting how the desulfurization rate changes in accordance with manganese compound concentration (mg/l as Mn) in the slurry in case an off-gas containing 1,200 ppm of $SO_2$ is subjected to the desulfurizing treatment by contacting said gas with a slurry containing calcium compounds, the depiction being based on the results obtained from the experiments conducted by the present inventors.

As seen from FIG. 1, the desulfurization rate changes while describing a specific curve, that is, it once drops but then rises up steadily, in accordance as the manganese concentration increases. It was thus found that for adjusting the desulfurization rate by changing the manganese concentration, it is necessary to conduct the just contrary operations, that is, either increase or decrease the manganese concentration at the point (I) or point (II) in FIG. 1.

The manganese concentration is in a very low range of 1 mg/l to 1,000 mg/l, which is far less than the calcium compound concentration (about 10 to 20 wt %) in the slurry, so that it is impossible to make the instantaneous measurement of manganese concentration continuously. For operating a wet-type exhaust fume desulfurization apparatus, therefore, it needs to provide a means which is capable of immediately determining the manganese concentration. Such means can be realized as follows. That is, a part of the slurry offered to the desulfurization treatment is introduced into an aeration tank while a gas containing oxygen is blown into the slurry in said tank, and the oxygen absorption in the aeration tank is detected by using an oxygen gas meter and a gas flowmeter. The oxygen absorption can be depicted as a simple interrelation with the manganese concentration in the slurry, as represented by curve (B) in FIG. 2.

Figure 2:
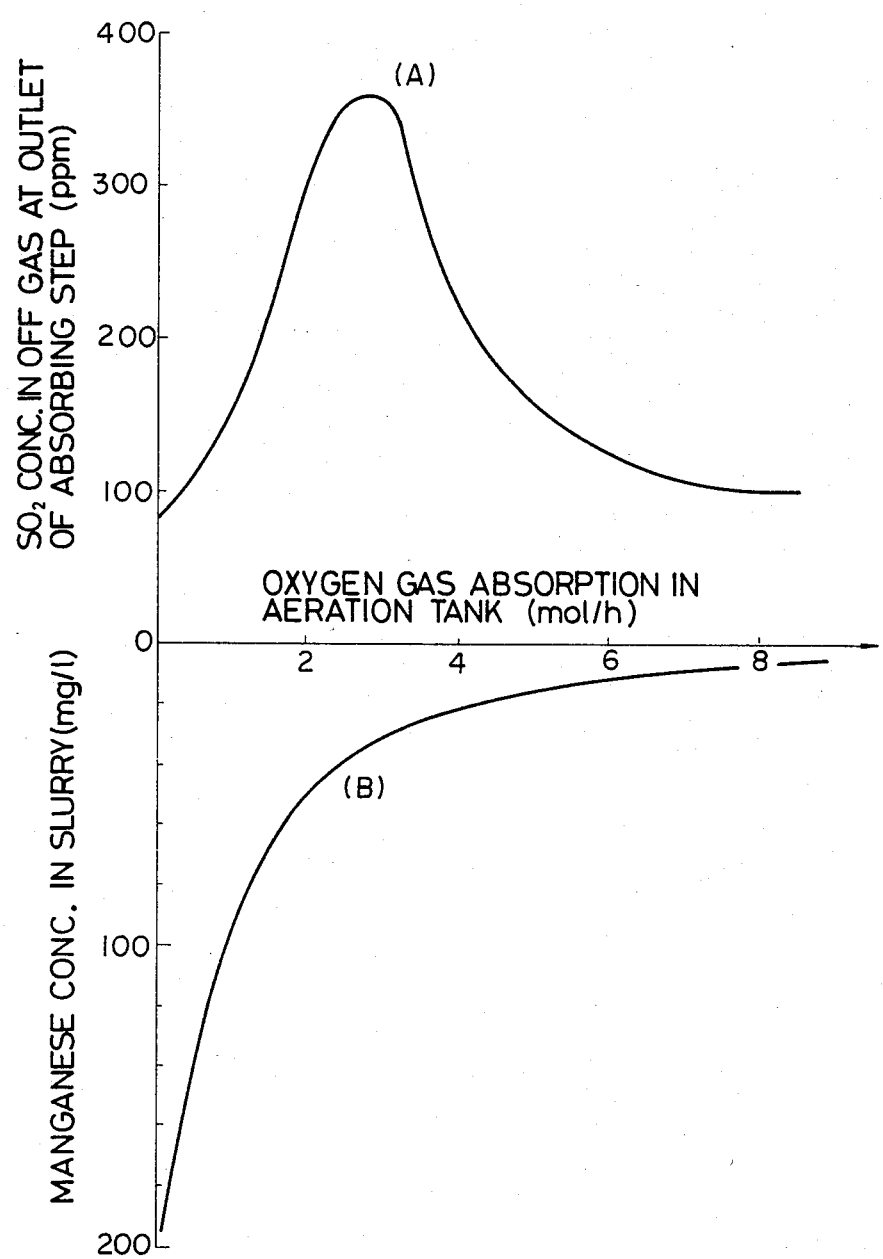
FIG. 2 is a diagram showing the relation between oxygen gas pickup (absorption) in an aeration cell utilized as an operating means in this invention and $SO_2$ concentration in the off-gas at the outlet of the absorbing step and manganese concentration in the slurry.

Thus, if a calibration curve of interrelation (B) such as shown in FIG. 2 is once drawn up, it is possible to determine the manganese concentration from the oxygen absorption in the aeration tank.

The oxygen absorption can be easily and continuously detected by calculating the difference in oxygen content between the aeration tank inlet gas and the outlet gas by using a commercial oxygen gas meter and a gas flowmeter.

The fact that the degree of oxygen absorption in the aeration cell is related to the degree of sulfite concentration in the slurry can be accounted for in reference to the above-shown chemical reaction formula (3). That is, it is considered that the increase of manganese concentration in the slurry promotes the oxidation reaction of the formula (3) by the oxygen in the off-gas when $SO_2$ is absorbed into the slurry in the absorbing step, and this decreases the sulfite concentration in the slurry, resulting in a corresponding reduction of oxygen absorption in the aeration cell.

Manganese compounds have been known as a catalysts which promote the oxidation reactions. It is also disclosed in the literature to supply a manganese compound to the absorption step in a wet-type exhaust fume desulfurization process to promote the formation of gypsum by oxidation. However, it has not been known that a typical phenomenon such as depicted in FIG. 1 should be observed in the desulfurization rate.

The present invention is especially characterized in that by making use of the phenomenon of FIG. 1, the control of the desulfurization rate is made by adjusting the manganese concentration, and that the determination of the manganese concentration is made by detecting the oxygen absorption in an aeration cell as illustrated in FIG. 2.

Composing the oxygen absorption/manganese concentration interrelation curve (B) of FIG. 2 and the desulfurization rate/manganese concentration interrelation curve of FIG. 1, there is obtained a curve of interrelation between oxygen absorption in the aeration cell and $SO_2$ concentration in off-gas at the outlet of the absorbing step, as shown by (A) in FIG. 2. It is seen from this curve (A) of FIG. 2 that the outlet $SO_2$ concentration lowers as the oxygen absorption in the aeration cell approaches zero, and the highest desulfurization rate is obtained.

It is thus possible to know the desulfurization performance in the absorbing step by merely detecting the oxygen absorption in the aeration tank. And the adjustment of oxygen absorption can be made by controlling the manganese concentration in the slurry in accordance with the interrelation depicted by (B) in FIG. 2.

It was found that if the manganese concentration is controlled so that the $SO_2$ absorption in the absorbing step will become about 5% by mole or less, with the oxygen absorption in the aeration cell being supposed stationary, it is possible to carry out the operation while confining said factors in the area on the left side of the peak of curve (A) in FIG. 2. In FIG. 2, the value of oxygen gas absorption in aeration tank of about 3 (mol/h) corresponds to about 5% by mole of $SO_2$ absorption in the absorbing step. That is, it was experimentally disclosed that the adjustment of the desulfurization rate in the absorbing step can be achieved as desired by controlling the oxygen gas absorption in the aeration cell, that is, by controlling the manganese concentration so that the following relation will be satisfied:

$$\frac{200 \times B \times C}{A \times S} \leq \text{about 5 (\% by mole)}$$

where A is the amount of slurry (l/h) introduced into the aeration cell from the absorbing step in a stationary state, C is the oxygen gas absorption (mol/h) in the aeration tank, S is the $SO_2$ absorption (mol/h) in the absorbing step in a stationary state, and B is the flow rate (l/h) of the slurry discharged out of the system from the absorbing step in a stationary state. This makes it possible to perform the operation only in the area on the (II) side in FIG. 1 while inhibiting entrance into the area on the (I) side.

An embodiment of this invention involving the above-said experimental disclosures will be described below with reference to FIG. 3.

EXAMPLE 1

Figure 3:
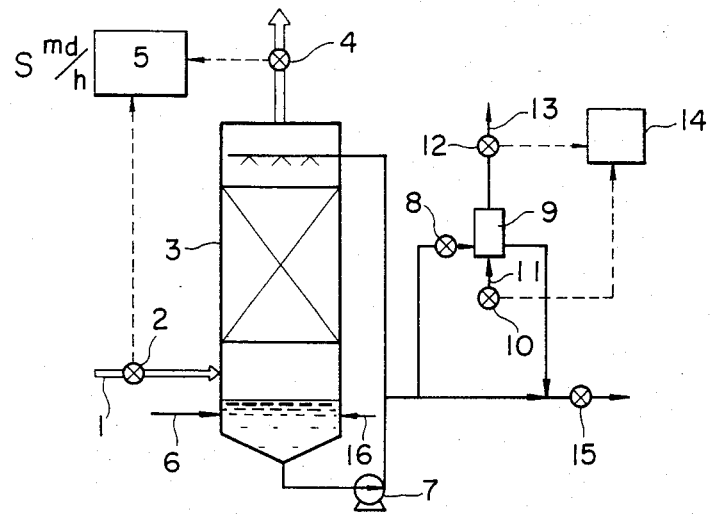
FIGS. 3 and 4 are the schematics illustrating the embodiments of the present invention. Like reference numerals indicate identical elements unless otherwise stated.

In FIG. 3, about 2,000 m³N/h of off-gas containing about 1,600 ppm of $SO_2$ is supplied into an absorption tower 3 through a duct 1 having disposed therein a detector terminal 2 for detecting the gas flow rate and $SO_2$ concentration. In the absorption tower 3, the off-gas is contacted with a slurry containing calcium compounds to undergo a desulfurization treatment and then leaves the absorption tower through a duct in which a $SO_2$ concentration detector terminal 4 is disposed. The $SO_2$ absorption (pickup) S (mol/h) can be determined by an $SO_2$ absorption detector 5 having the ability to operate the signals from said both detector terminals 2 and 4. A slurry containing calcium compounds such as $CaCO_3$ and $Ca(OH)_2$ serving as $SO_2$ absorbent in an amount substantially equivalent to the $SO_2$ absorption is supplied into the absorption tower 3 from a line 6, and a large amount of such slurry is circulated in the tower by a circulation pump 7. A part of said circulating slurry is led into an aeration tank 9 through a flow rate detector 8. Numerals 10 and 12 designate the detector terminals for detecting the gas flow rate and $O_2$ concentration, respectively. A gas containing oxygen is blown into the slurry in the aeration tank 9 through a line 11 provided with a detector terminal 10, and the residual gas is discharged out through a line 13 provided with the detector terminal 12. The oxygen gas absorption C (mol/h) can be determined by an oxygen gas absorption detector 14 which operates the signals from said detector terminals 10 and 12.

Since the absorbent is supplied from the line 6 in proportion to the $SO_2$ absorption, a part of the circulating slurry is withdrawn from the absorption tower according to the mass balance while detecting the flow rate by the flow rate detector 15. Assuming that the flow rates determined by the respective flow rate detectors 8 and 15 are A (l/h) and B (l/h), then the value of $(200 \times B \times C)/(A \times S)$ can be determined by using the operation values of S (mol/h) and C (mol/h).

In this embodiment, the desulfurization rate was determined in a stationary state when the system was run by supplying manganese sulfate from the line 16 and changing the manganese concentration in the circulating slurry, and such desulfurization rate was shown in FIG. 1 while the interrelation between said manganese concentration and oxygen gas absorption C (mol/h) in the aeration tank was shown in FIG. 2.

The manganese concentration at the lowest desulfurization rate in FIG. 1 is about 40 mg/l, which agrees with that at the highest outlet $SO_2$ concentration in FIG. 2, and $(200 \times B \times C)/(A \times S)$ was about 5 (% by mole). Thus the desulfurization rate increases either when the value of $(200 \times B \times C)/(A \times S)$ becomes smaller than 5 or when it becomes greater than 5, but it is preferred to conduct the absorbing operation in the area where said value is smaller than 5, that is, the area where the desulfurization rate increases as C becomes smaller, because the operation in this area is advantageous in being easier to adjust the feed of manganese compound and also easier to control the desulfurization rate. That is, in case of adjusting Mn concentration, when the operation is made in the area on the right side of the peak of curve (A) in FIG. 2 where the Mn concentration is low, the operation becomes difficult because even a slight variation of Mn concentration leads to a large change of $O_2$ gas absorption as well as $SO_2$ concentration in the outlet off-gas. On the other hand, in the area on the left side of the peak of FIG. 2 (A), the Mn concentration adjustment can be made with a greater tolerance. For instance, it can be seen that in case there occurs an Mn concentration change of 10 mg/l (which corresponds to the case where the feed adjustment had an error of 10 mg/l), the outlet $SO_2$ concentration changes by about 100 ppm on the right side of the peak but the change is only about 20 ppm on the left side of the peak. Thus, in the case of controlling the desulfurization rate, the operation becomes easier when a wider selection is allowed for the amount of Mn to be treated.

EXAMPLE 2

Figure 4:
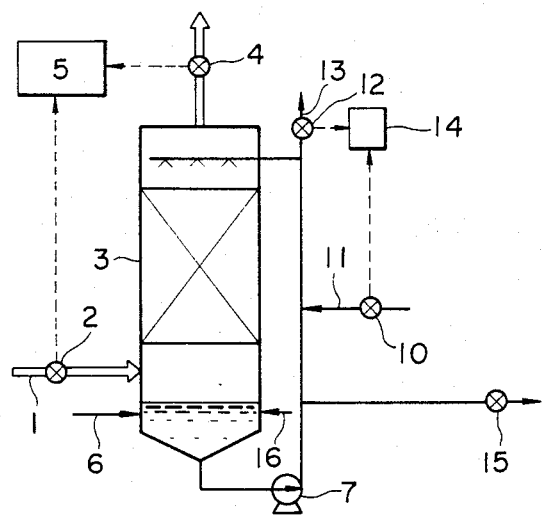

FIG. 4 illustrates an embodiment where a gas containing $O_2$ is blown into the circulating slurry through a line 11. In this case, the oxygen gas concentration in the slurry is detected by an $O_2$ concentration detector terminal 12, and the circulating slurrying piping can substitute the aeration tank. Even with this embodiment where no aeration tank such as used in the embodiment of FIG. 3 is provided, it is possible to attain the effect of this invention in just the same way as in Example 1.

Also, as analogized from FIG. 4, the detection of oxygen gas absorption can be made at any part of the circulating slurry, such as the slurry in the absorption tower or the slurry in the lower tank of the absorption tower, so that the detector arrangement is of course not limited to the embodiments of FIGS. 3 and 4.

What is claimed is:

1. An exhaust fume desulfurization process which comprises the steps of:
    contacting an off-gas containing $SO_2$ with a slurry containing calcium and manganese compounds;
    introducing a gas containing oxygen into said slurry;
    detecting the amount of the absorption of oxygen by said slurry;
    regulating the amount of manganese present in the slurry based upon the amount of oxygen absorbed by said slurry whereby the desulfurization rate is correspondingly adjusted; and
    recovering the desulfurized gas product.

2. The exhaust fume desulfurization process according to claim 1, wherein the amount of manganese compound is regulated based upon the interrelation between the desulfurization rate and the manganese concentration in the slurry and the interrelation between the manganese concentration and the absorption of the oxygen gas into the slurry.

3. The exhaust fume desulfurization process according to claim 1, wherein the manganese compound is separately fed to the slurry.

4. The exhaust fume desulfurization process according to claim 1, wherein the manganese compound is manganese sulfate.

5. An exhaust fume desulfurization process which comprises the steps of:
    introducing a slurry containing calcium compounds into an absorption tower;
    introducing a manganese compound into said slurry;
    introducing an off-gas containing $SO_2$ into said absorption tower where it is contacted with said slurry;
    withdrawing said slurry from said absorption tower, a portion of said slurry being recycled into said absorption tower;
    introducing a gas containing oxygen into said slurry;
    detecting the amount of the absorption of oxygen by said slurry;
    regulating the amount of manganese present in the slurry based upon the amount of oxygen absorbed by said slurry whereby the desulfurization rate is correspondingly adjusted; and
    removing desulfurized off-gas from said absorption tower.

6. The exhaust fume desulfurization process according to claim 5, wherein the gas containing oxygen is introduced into the portion of said slurry being recycled back to the absorption tower.

7. The exhaust fume desulfurization process according to claim 5, which further comprises:
    separating a part of said recycled slurry and introducing it into an aeration tank; and
    introducing the gas containing oxygen into said aeration tank for detection of oxygen absorption by the slurry.

8. The exhaust fume desulfurization process according to claim 7, wherein the detection of oxygen gas absorption is accomplished by calculating the difference in oxygen content between the gas containing oxygen being introduced into said aeration tank and the gas being withdrawn from said aeration tank.

9. The exhaust fume desulfurization process according to claim 5, wherein the manganese compound is manganese sulfate.

10. The exhaust fume desulfurization process according to claim 5, wherein the amount of manganese compound is regulated based upon the interrelation between the desulfurization rate and the manganese concentration in the slurry and the interrelation between the manganese concentration and the absorption of the oxygen gas into the slurry.

11. The exhaust fume desulfurization process according to claim 6, wherein the concentration of manganese in the slurry in the absorption tower is adjusted so that the value of $$\frac{20 \times B \times C}{A \times S} \text{ becomes less than 5,}$$

wherein A is the amount of the slurry being recycled back to the absorption tower in liters/hr.; B is the amount of slurry that is withdrawn from the absorption tower and not recycled back into the absorption tower in liters/hr.; S is the amount of absorption by the slurry of $SO_2$ in the absorbing tower in moles/hr.; and C is the amount of absorption of oxygen gas by the portion of the slurry being recycled back to the absorption tower in moles/hr.

12. The exhaust fume desulfurization process according to claim 7, wherein the concentration of manganese in the slurry in the absorption tower is adjusted so that the value of $$\frac{20 \times B \times C}{A \times S} \text{ becomes less than 5,}$$

wherein A is the amount of slurry introduced into the aeration tank in liters/hr.; B is the amount of slurry that is withdrawn from the absorption tower and not recycled back into the absorption tower in liters/hr.; S is the amount of absorption by the slurry of $SO_2$ in the absorbing tower in moles/hr.; and C is the amount of absorption of oxygen gas in the aeration tank in moles/hr.

* * * * *